United States Patent
Issa et al.

(10) Patent No.: US 7,925,592 B1
(45) Date of Patent: Apr. 12, 2011

(54) SYSTEM AND METHOD OF USING A PROXY SERVER TO MANAGE LAZY CONTENT DISTRIBUTION IN A SOCIAL NETWORK

(75) Inventors: Alfredo Issa, Apex, NC (US); Richard Walsh, Raleigh, NC (US); Christopher Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 875 days.

(21) Appl. No.: 11/528,155

(22) Filed: Sep. 27, 2006

(51) Int. Cl.
*G06F 21/00* (2006.01)
*H04K 1/00* (2006.01)
*H04L 9/00* (2006.01)

(52) U.S. Cl. .............................. 705/59; 705/52

(58) Field of Classification Search .............. None
See application file for complete search history.

(56) References Cited

U.S. PATENT DOCUMENTS

| | | | |
|---|---|---|---|
| 5,220,657 A | 6/1993 | Bly et al. |
| 5,517,617 A | 5/1996 | Sathaye et al. |
| 5,537,586 A | 7/1996 | Amram et al. |
| 5,629,980 A | 5/1997 | Stefik et al. |
| 5,754,939 A | 5/1998 | Herz et al. |
| 5,884,035 A | 3/1999 | Butman et al. |
| 5,892,900 A | 4/1999 | Ginter et al. |
| 6,073,138 A | 6/2000 | de l'Etraz et al. |
| 6,088,702 A | 7/2000 | Plantz et al. |
| 6,149,441 A | 11/2000 | Pellegrino et al. |
| 6,151,624 A | 11/2000 | Teare et al. |
| 6,260,069 B1 | 7/2001 | Anglin |
| 6,275,819 B1 | 8/2001 | Carter |
| 6,311,194 B1 | 10/2001 | Sheth et al. |
| 6,314,409 B2 | 11/2001 | Schneck et al. |
| 6,338,086 B1 | 1/2002 | Curtis et al. |
| 6,389,409 B1 | 5/2002 | Horovitz et al. |
| 6,389,541 B1 | 5/2002 | Patterson |

(Continued)

FOREIGN PATENT DOCUMENTS

EP 1 338 966 A3 8/2003

(Continued)

OTHER PUBLICATIONS

Architecture of Windows Media Rights Manager, www.microsoft.com/windows/windowsmedia/howto/articles/ drmarchitecture.aspx.

(Continued)

*Primary Examiner* — Evens J Augustin
*Assistant Examiner* — C. Aaron McIntyre
(74) *Attorney, Agent, or Firm* — Withrow & Terranova, PLLC

(57) ABSTRACT

A proxy server and corresponding method are provided for managing the controlled distribution of digital content as it propagates through a social network. A proxy server receives digital content and associated distribution parameters from an originating peer. The distribution parameters define access rights for n allowable levels of possible network distribution. After other peers are invited to share the digital content or the invited peers request access to the digital content, the proxy server generates a rights-managed form of the requested digital content in accordance with the access rights established by the originating peer for the level associated with the requesting peer(s). The proxy server forwards a copy of a content key and other content identifiers to an associated license server and then sends the rights-managed form of digital content to the requesting peer(s).

18 Claims, 4 Drawing Sheets

U.S. PATENT DOCUMENTS

| | | |
|---|---|---|
| 6,421,439 B1 | 7/2002 | Liffick |
| 6,442,693 B1 | 8/2002 | Sandgren et al. |
| 6,463,433 B1 | 10/2002 | Baclawski |
| 6,480,885 B1 | 11/2002 | Olivier |
| 6,498,795 B1 | 12/2002 | Zhang et al. |
| 6,519,629 B2 | 2/2003 | Harvey et al. |
| 6,525,747 B1 | 2/2003 | Bezos |
| 6,553,367 B2 | 4/2003 | Horovitz et al. |
| 6,560,578 B2 | 5/2003 | Eldering |
| 6,567,122 B1 | 5/2003 | Anderson et al. |
| 6,581,072 B1 | 6/2003 | Mathur et al. |
| 6,594,693 B1 | 7/2003 | Borwankar |
| 6,629,100 B2 | 9/2003 | Morris et al. |
| 6,630,944 B1 | 10/2003 | Kakuta et al. |
| 6,631,098 B2 | 10/2003 | Chang et al. |
| 6,651,086 B1 | 11/2003 | Manber et al. |
| 6,687,732 B1 | 2/2004 | Bector et al. |
| 6,701,362 B1 | 3/2004 | Subramonian et al. |
| 6,748,420 B1 | 6/2004 | Quatrano et al. |
| 6,757,517 B2 | 6/2004 | Chang |
| 6,772,160 B2 | 8/2004 | Cho et al. |
| 6,785,704 B1 | 8/2004 | McCanne |
| 6,816,906 B1 | 11/2004 | Icken et al. |
| 6,832,245 B1 | 12/2004 | Isaacs et al. |
| 6,839,680 B1 | 1/2005 | Liu et al. |
| 6,917,944 B1 | 7/2005 | Prasad et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,970,840 B1 | 11/2005 | Yu et al. |
| 6,980,993 B2 | 12/2005 | Horvitz et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev et al. |
| 7,024,391 B2 | 4/2006 | Burich |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,054,900 B1 | 5/2006 | Goldston |
| 7,058,606 B2 | 6/2006 | Stefik et al. |
| 7,058,897 B2 | 6/2006 | Matsuda |
| 7,069,308 B2 | 6/2006 | Abrams |
| 7,103,634 B1 | 9/2006 | Ullmann et al. |
| 7,107,317 B2 | 9/2006 | Demsky et al. |
| 7,120,681 B2 | 10/2006 | Frelechoux et al. |
| 7,150,030 B1 | 12/2006 | Eldering et al. |
| 7,177,929 B2 | 2/2007 | Burbeck et al. |
| 7,251,689 B2 | 7/2007 | Wesley |
| 7,281,274 B2 | 10/2007 | Manning et al. |
| 7,302,429 B1 | 11/2007 | Wanker |
| 7,359,894 B1 | 4/2008 | Liebman et al. |
| 7,370,015 B2 | 5/2008 | Gvily |
| 7,383,433 B2 | 6/2008 | Yeager et al. |
| 7,526,458 B2 | 4/2009 | Flinn et al. |
| 7,594,244 B2 | 9/2009 | Scholl et al. |
| 7,607,164 B2 | 10/2009 | Vasishth et al. |
| 7,685,135 B2 | 3/2010 | Brooke et al. |
| 7,716,220 B2 | 5/2010 | Michelitsch et al. |
| 2001/0007099 A1 | 7/2001 | Rau et al. |
| 2001/0042043 A1 | 11/2001 | Shear et al. |
| 2002/0032634 A1 | 3/2002 | Abrams et al. |
| 2002/0032905 A1 | 3/2002 | Sherr et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0078206 A1 | 6/2002 | Boies et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0124053 A1 | 9/2002 | Adams et al. |
| 2002/0138744 A1 | 9/2002 | Schleicher et al. |
| 2002/0152322 A1 | 10/2002 | Hay |
| 2002/0156875 A1 | 10/2002 | Pabla |
| 2002/0156893 A1 | 10/2002 | Pouyoul et al. |
| 2002/0156917 A1 | 10/2002 | Nye |
| 2002/0169737 A1 | 11/2002 | Armstrong et al. |
| 2002/0178164 A1 | 11/2002 | Wisniewski |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028395 A1 | 2/2003 | Rodgers et al. |
| 2003/0028596 A1 | 2/2003 | Toyota et al. |
| 2003/0028639 A1 | 2/2003 | Yamamoto et al. |
| 2003/0046587 A1 | 3/2003 | Bheemarasetti et al. |
| 2003/0050976 A1 | 3/2003 | Block et al. |
| 2003/0050977 A1 | 3/2003 | Puthenkulam et al. |
| 2003/0061282 A1 | 3/2003 | Ebata et al. |
| 2003/0061287 A1 | 3/2003 | Yu et al. |
| 2003/0078858 A1 | 4/2003 | Angelopoulos et al. |
| 2003/0079120 A1 | 4/2003 | Hearn et al. |
| 2003/0084162 A1 | 5/2003 | Johnson et al. |
| 2003/0093520 A1 | 5/2003 | Beesley |
| 2003/0105812 A1 | 6/2003 | Flowers, Jr. et al. |
| 2003/0112823 A1 | 6/2003 | Collins et al. |
| 2003/0120662 A1 | 6/2003 | Vishik |
| 2003/0120680 A1 | 6/2003 | Agrawal et al. |
| 2003/0120928 A1 | 6/2003 | Cato et al. |
| 2003/0135576 A1 | 7/2003 | Bodin |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0179228 A1 | 9/2003 | Schreiber et al. |
| 2003/0191814 A1 | 10/2003 | Tran |
| 2003/0195851 A1 | 10/2003 | Ong |
| 2003/0195924 A1 | 10/2003 | Franke et al. |
| 2003/0204605 A1 | 10/2003 | Hudson et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0024720 A1 | 2/2004 | Fairweather |
| 2004/0024892 A1 | 2/2004 | Creswell et al. |
| 2004/0039913 A1 | 2/2004 | Kruse |
| 2004/0044727 A1 | 3/2004 | Abdelaziz et al. |
| 2004/0044774 A1 | 3/2004 | Mangalik et al. |
| 2004/0054723 A1 | 3/2004 | Dayal et al. |
| 2004/0064416 A1 | 4/2004 | Peled et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0122958 A1 | 6/2004 | Wardrop |
| 2004/0137882 A1 | 7/2004 | Forsyth |
| 2004/0148275 A1 | 7/2004 | Achlioptas |
| 2004/0148434 A1 | 7/2004 | Matsubara et al. |
| 2004/0148503 A1 | 7/2004 | Sidman |
| 2004/0148523 A1* | 7/2004 | Lambert ..................... 713/201 |
| 2004/0162871 A1 | 8/2004 | Pabla et al. |
| 2004/0181487 A1 | 9/2004 | Hanson |
| 2004/0181540 A1 | 9/2004 | Jung et al. |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220893 A1 | 11/2004 | Spivack et al. |
| 2004/0220957 A1 | 11/2004 | McDonough |
| 2004/0237045 A1 | 11/2004 | Meltzer |
| 2004/0249768 A1 | 12/2004 | Kontio et al. |
| 2004/0260968 A1 | 12/2004 | Edwards et al. |
| 2004/0267625 A1 | 12/2004 | Feng et al. |
| 2005/0015357 A1 | 1/2005 | Shahidi |
| 2005/0021096 A1 | 1/2005 | Mower |
| 2005/0021398 A1 | 1/2005 | McCleskey et al. |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0047573 A1 | 3/2005 | Cameron et al. |
| 2005/0091289 A1 | 4/2005 | Shappell et al. |

| | | | | | | |
|---|---|---|---|---|---|---|
| 2005/0091316 A1 | 4/2005 | Ponce et al. | | 2006/0095471 A1 | 5/2006 | Krikorian et al. |
| 2005/0094313 A1 | 5/2005 | Kim | | 2006/0095514 A1 | 5/2006 | Wang et al. |
| 2005/0097170 A1 | 5/2005 | Zhu et al. | | 2006/0095792 A1 | 5/2006 | Hurtado et al. |
| 2005/0114672 A1 | 5/2005 | Duncan et al. | | 2006/0095976 A1 | 5/2006 | Torres et al. |
| 2005/0114783 A1 | 5/2005 | Szeto | | 2006/0107286 A1 | 5/2006 | Connor et al. |
| 2005/0138430 A1 | 6/2005 | Landsman | | 2006/0117090 A1 | 6/2006 | Schellingerhout et al. |
| 2005/0149621 A1 | 7/2005 | Kirkland et al. | | 2006/0117378 A1 | 6/2006 | Tam et al. |
| 2005/0154701 A1 | 7/2005 | Parunak et al. | | 2006/0121988 A1 | 6/2006 | Reville et al. |
| 2005/0159970 A1 | 7/2005 | Buyukkokten et al. | | 2006/0123127 A1 | 6/2006 | Littlefield |
| 2005/0159998 A1 | 7/2005 | Buyukkokten et al. | | 2006/0136419 A1 | 6/2006 | Brydon et al. |
| 2005/0163135 A1 | 7/2005 | Hopkins | | 2006/0136551 A1 | 6/2006 | Amidon et al. |
| 2005/0165726 A1 | 7/2005 | Kawell, Jr. et al. | | 2006/0143068 A1 | 6/2006 | Calabria |
| 2005/0171799 A1 | 8/2005 | Hull et al. | | 2006/0143084 A1 | 6/2006 | Donnelli et al. |
| 2005/0171832 A1 | 8/2005 | Hull et al. | | 2006/0143183 A1 | 6/2006 | Goldberg et al. |
| 2005/0171954 A1 | 8/2005 | Hull et al. | | 2006/0143236 A1 | 6/2006 | Wu |
| 2005/0171955 A1 | 8/2005 | Hull et al. | | 2006/0146765 A1 | 7/2006 | Van De Sluis et al. |
| 2005/0172001 A1 | 8/2005 | Zaner et al. | | 2006/0155813 A1 | 7/2006 | Dietz et al. |
| 2005/0172116 A1 | 8/2005 | Burch et al. | | 2006/0167804 A1 | 7/2006 | Aydar et al. |
| 2005/0177385 A1 | 8/2005 | Hull et al. | | 2006/0167855 A1 | 7/2006 | Ishikawa et al. |
| 2005/0177614 A1 | 8/2005 | Bourne | | 2006/0173838 A1 | 8/2006 | Garg et al. |
| 2005/0188108 A1 | 8/2005 | Carter et al. | | 2006/0173957 A1 | 8/2006 | Robinson et al. |
| 2005/0195978 A1 | 9/2005 | Babic et al. | | 2006/0173963 A1 | 8/2006 | Roseway et al. |
| 2005/0197846 A1 | 9/2005 | Pezaris et al. | | 2006/0184997 A1 | 8/2006 | La Rotonda et al. |
| 2005/0198031 A1 | 9/2005 | Pezaris et al. | | 2006/0190536 A1 | 8/2006 | Strong et al. |
| 2005/0198131 A1 | 9/2005 | Appelman et al. | | 2006/0195462 A1 | 8/2006 | Rogers |
| 2005/0198172 A1 | 9/2005 | Appelman et al. | | 2006/0200434 A1 | 9/2006 | Flinn et al. |
| 2005/0198290 A1 | 9/2005 | Berkey et al. | | 2006/0200435 A1 | 9/2006 | Flinn et al. |
| 2005/0198305 A1 | 9/2005 | Pezaris et al. | | 2006/0209727 A1 | 9/2006 | Jennings, III et al. |
| 2005/0201290 A1 | 9/2005 | Vasudev et al. | | 2006/0218225 A1 | 9/2006 | Hee Voon et al. |
| 2005/0203801 A1 | 9/2005 | Morgenstern et al. | | 2006/0218577 A1 | 9/2006 | Goodman et al. |
| 2005/0204038 A1 | 9/2005 | Medvinsky et al. | | 2006/0248122 A1 | 11/2006 | Nikiel et al. |
| 2005/0210104 A1 | 9/2005 | Torvinen | | 2006/0248573 A1* | 11/2006 | Pannu et al. ............ 726/1 |
| 2005/0210409 A1 | 9/2005 | Jou | | 2006/0259957 A1 | 11/2006 | Tam et al. |
| 2005/0215660 A1 | 9/2005 | Tomikawa et al. | | 2006/0267940 A1 | 11/2006 | Groom et al. |
| 2005/0216300 A1 | 9/2005 | Appelman et al. | | 2007/0028000 A1 | 2/2007 | Ebbesen et al. |
| 2005/0216550 A1 | 9/2005 | Paseman et al. | | 2007/0061487 A1 | 3/2007 | Moore et al. |
| 2005/0229243 A1 | 10/2005 | Svendsen et al. | | 2007/0106551 A1 | 5/2007 | McGucken |
| 2005/0232423 A1 | 10/2005 | Horvitz et al. | | 2007/0143228 A1 | 6/2007 | Jorden et al. |
| 2005/0234864 A1 | 10/2005 | Shapiro | | 2007/0150603 A1 | 6/2007 | Crull et al. |
| 2005/0235062 A1 | 10/2005 | Lunt et al. | | 2007/0192294 A1 | 8/2007 | Ramer et al. |
| 2005/0240773 A1 | 10/2005 | Hilbert et al. | | 2007/0192299 A1 | 8/2007 | Zuckerberg et al. |
| 2005/0243736 A1 | 11/2005 | Faloutsos et al. | | 2007/0220575 A1 | 9/2007 | Cooper et al. |
| 2005/0246420 A1 | 11/2005 | Little, II | | 2007/0233828 A1 | 10/2007 | Gilbert |
| 2005/0251553 A1 | 11/2005 | Gottfried | | 2007/0255785 A1 | 11/2007 | Hayashi et al. |
| 2005/0251675 A1 | 11/2005 | Marcjan et al. | | 2008/0016081 A1 | 1/2008 | MacMillan et al. |
| 2005/0256866 A1 | 11/2005 | Lu et al. | | 2008/0059992 A1 | 3/2008 | Amidon et al. |
| 2005/0256909 A1 | 11/2005 | Aboulhosn et al. | | 2009/0030943 A1 | 1/2009 | Kall |
| 2005/0262162 A1 | 11/2005 | Levy | | | | |
| 2005/0262199 A1 | 11/2005 | Chen et al. | | | | |
| 2005/0262246 A1 | 11/2005 | Menon et al. | | | | |
| 2005/0262530 A1 | 11/2005 | Ruetschi et al. | | | | |
| 2005/0263829 A1 | 12/2005 | Lee et al. | | | | |
| 2005/0266835 A1 | 12/2005 | Agrawal et al. | | | | |
| 2005/0267766 A1 | 12/2005 | Galbreath et al. | | | | |
| 2005/0267940 A1 | 12/2005 | Galbreath et al. | | | | |
| 2005/0283497 A1 | 12/2005 | Nurminen et al. | | | | |
| 2005/0289648 A1 | 12/2005 | Grobman et al. | | | | |
| 2006/0004789 A1 | 1/2006 | Lunt et al. | | | | |
| 2006/0004892 A1 | 1/2006 | Lunt et al. | | | | |
| 2006/0010225 A1 | 1/2006 | Issa | | | | |
| 2006/0015588 A1 | 1/2006 | Achlioptas et al. | | | | |
| 2006/0020960 A1 | 1/2006 | Relan et al. | | | | |
| 2006/0021009 A1 | 1/2006 | Lunt | | | | |
| 2006/0026235 A1 | 2/2006 | Schwarz et al. | | | | |
| 2006/0031489 A1 | 2/2006 | Marcjan | | | | |
| 2006/0031770 A1 | 2/2006 | McMenamin | | | | |
| 2006/0035766 A1 | 2/2006 | Towley, III et al. | | | | |
| 2006/0036641 A1 | 2/2006 | Brydon et al. | | | | |
| 2006/0036766 A1 | 2/2006 | Baupin et al. | | | | |
| 2006/0047839 A1 | 3/2006 | Tate et al. | | | | |
| 2006/0048059 A1 | 3/2006 | Etkin | | | | |
| 2006/0048132 A1 | 3/2006 | Chen et al. | | | | |
| 2006/0053380 A1 | 3/2006 | Spataro et al. | | | | |
| 2006/0059571 A1 | 3/2006 | Chen et al. | | | | |
| 2006/0063552 A1 | 3/2006 | Tillet et al. | | | | |
| 2006/0064431 A1 | 3/2006 | Kishore et al. | | | | |
| 2006/0085248 A1 | 4/2006 | Arnett et al. | | | | |
| 2006/0089913 A1 | 4/2006 | Jaipuria et al. | | | | |
| 2006/0090137 A1 | 4/2006 | Cheng et al. | | | | |

FOREIGN PATENT DOCUMENTS

| | | | |
|---|---|---|---|
| WO | WO 2005/111760 A1 | 11/2005 | |
| WO | WO2007070676 A2 | 6/2007 | |

OTHER PUBLICATIONS

FOAF Vocabulary Specification, http://xmlns.com/foaf/0.1/.

Deborah L. McGuinness et al., editors; "OWL Web Ontology Language—Overview", copyright 2004 World Wide Web Consortium (W3C), published Feb. 10, 2004, http://www.w3.org/TR/2004/REC-owl-features-20040210/, 19 pages.

Pidgin, http://pidgin.im/pidgin/home/.

Pretschner, Alexander et al., "Ontology Based Personalized Search," Proceedings of the 11th IEEE International Conference on Tools with Artificial Intelligence, p. 391, Nov. 8-10, 1999.

Warren Sack, "Discourse Diagrams: Interface Design for Very Large-Scale Conversations," System Sciences, Proceedings of the 33rd Annual Hawaii International Conference, 2000.

Marc A. Smith and Andrew T. Fiore, "Visualization Components for Persistent Conversations," Sep. 2000.

Srinivasan, T. et al., "OPSHNN: Ontology Based Personalized Searching Using Hierarchical Neural Networks Evidence Combination," The Sixth IEEE International Conference on Computer and Information Technology 2006, pp. 44-44, Sep. 2006.

The Case for a Hybrid P2P Search Infrastructure, http://www.cs.berkeley.edu/~boonloo/research/pier/casehybrid_iptps.ppt.

Dijkstra's algorithm, http://en.wikipedia.org/wiki/Dijkstra's_algorithm.

Welcome to Facebook!, http://www.facebook.com/.

The Friend of a Fried (FOAF) Project, http://www.foaf-project.com.
Friendster—Home, http://www.friendster.com.
News—Gaim 1.5.0, http://www.gaim.sourceforge.net.
Huminity—Social Networking, http://www.huminity.com/english/software.html.

ICQ, http://www.icq.com/.
MySpace, http://www.myspace.com.
Beverly Yang et al., "Designing a Super-Peer Network," 19th International Conference on Data Engineering (ICDE'03), 2003.

* cited by examiner

SYSTEM AND METHOD OF USING A PROXY SERVER TO MANAGE LAZY CONTENT DISTRIBUTION IN A SOCIAL NETWORK

FIELD OF THE INVENTION

The present invention generally relates to controlled sharing of digital content over a network, and is more particularly concerned with aspects of a proxy server for managing digital rights for selected content as it is propagates through a social network, coordinating the creation of modified versions of the digital content as requested for various levels within the social network, and storing information associated with content distribution.

BACKGROUND OF THE INVENTION

Modern technology has provided consumers with a wide variety of electronic devices with which to capture digital content, such as but not limited to content captured in video, audio, photo, text or other format. This phenomenon coupled with advances in networked communication, such as communication via the Internet, has resulted in greater content sharing among individuals. Several existing computer-based applications or related systems provide features for assisting a content producer with the distribution of digital content.

There are systems in place today that can distribute content to a known set of users. Also, some peer-to-peer (P2P) systems exist that can distribute content to anyone and everyone. However, such known systems do not account for potential scenarios where a content producer desires a limited, controlled distribution to a dynamic, unstructured social network. For example, a teenager creates a home video for fun. He wants some of his friends to see it, but not the entire world. Another scenario may involve a movie producer who wants to distribute a movie preview to a select number of reviewers and their associates, but not to everyone. Yet another example is where a family takes some video of a child's birthday party. The family would like for extended family and close friends to see it, but not have it available to the general public.

The scenarios mentioned above involve situations where a "limited viral distribution" is desired. The content producer does not want to identify exactly who is extended family or what constitutes "close friend". Ideally, the content producer wants the content to spread virally to some "degree of separation". "Degree of separation" used here refers to how far away (levels) one user is away from the originating user in a "friend of a friend" (FOAF) or other type of social network. In these examples the user wants to seed the content to a select group of people and allow them to have the freedom to spread the content further—at their discretion, and to users of their choice. However, the viral spread needs to be controlled, so as not to permit the content going to the general public. Additionally, the content producer may want to provide a different quality or portion of the content for users as they are farther "out" on the social network. In order to implement technology that provides a content producer with an ability to virally distribute digital content to their social network while providing controls on distribution and access, unique mechanisms for digital rights and license management are needed. An exemplary content distribution system and method with features for implementing digital rights management and license distribution is disclosed in U.S. patent application Ser. No. 11/516,231, entitled "SYSTEM AND METHOD FOR RIGHTS PROPAGATION AND LICENSE MANAGEMENT IN CONJUNCTION WITH DISTRIBUTION OF DIGITAL CONTENT IN A SOCIAL NETWORK", filed on Sep. 6, 2006, currently pending, which is hereby incorporated by reference in its entirety for all purposes. Such reference configures and manages controlled content distribution based on a number of levels, or "degrees of separation" among a content producer and one or more content recipients, and further accommodates license creation based on predefined level-rights selected by the content producer.

In accordance with the above exemplary rights propagation and license management technology, a license server is primarily responsible for issuing licenses, while a peer-to-peer (P2P) network generally handles content propagation. This configuration effectively prevents peers from modifying content before sending the content downstream to another peer. This means that the digital content selected for controlled distribution must be copied in its entirety and sent through the network, but only the relevant portions will be used as specified in given level-rights for the content. A system and method that addresses such inefficiencies is needed. Although various hybrid P2P models, proxies and reverse proxies exist, no solution that addresses all the features and aspects of the present subject matter has been developed.

SUMMARY OF THE INVENTION

Objects and advantages of the invention will be set forth in part in the following description, or may be obvious from the description, or may be learned through practice of the invention.

One exemplary embodiment of the presently disclosed technology corresponds to a proxy server for a hybrid peer-to-peer system. The proxy server includes a communications interface for coupling the license server to a network, a processor unit, and at least one portion of computer-readable medium for storing program code that is read and executed by the processor unit. The processor unit and the at least one portion of computer-readable medium function together as a special-purpose control system to receive a request for digital content from a requesting node, generate a rights-managed form of the requested digital content in accordance with rights established by an originating node, and send a copy of the rights-managed form of the requested digital content to the requesting node.

In another exemplary embodiment of the disclosed technology, a method of configuring and distributing rights-managed forms of digital content includes a first step of receiving via secure connection digital content for controlled distribution and distribution parameters associated with the digital content from an originating node. The received distribution parameters define access rights for n allowable levels of possible distribution in a social network. A subsequent step in the exemplary method corresponds to generating a rights-managed form of the requested digital content in accordance with the access rights established by the originating node for the level associated with a requesting node. A copy of the rights-managed form of the requested digital content is then sent to the requesting node.

Additional features and/or steps may be incorporated with more particular embodiments of the subject technology. The proxy server or associated methodology may involve caching a copy of the generated rights-managed form(s) of the digital content. A unique key for the digital content may also be generated, stored in a local database, and/or sent along with other identification parameters to a license server that generates level-licenses for the digital content. The proxy server or associated methodology may also include features or steps for receiving and storing updates to one or more distribution parameters defined by the originating node. Such distribution parameters may define level-rights to the digital content for n different levels of allowed distribution in the social network. Such level-rights may include one or more degradation characteristics for applying to the digital content and/or augmentation files for adding to the digital content.

In still further embodiments, the steps of generating and sending rights-managed forms of the digital content are delegated by the proxy server to a separate peer node in the network, after which time the proxy server caches a copy of the rights-managed form generated by such delegated node. The delegated node may correspond to the originating node in some embodiments, or to other nodes in the network.

Other features and aspects of the present invention are discussed in greater detail below.

BRIEF DESCRIPTION OF THE SEVERAL VIEWS OF THE DRAWINGS

The foregoing and other features, aspects and advantages of the present invention will become better understood with regard to the following description, appended claims and accompanying drawings where:

DETAILED DESCRIPTION OF THE PREFERRED EMBODIMENTS

Figure 1:
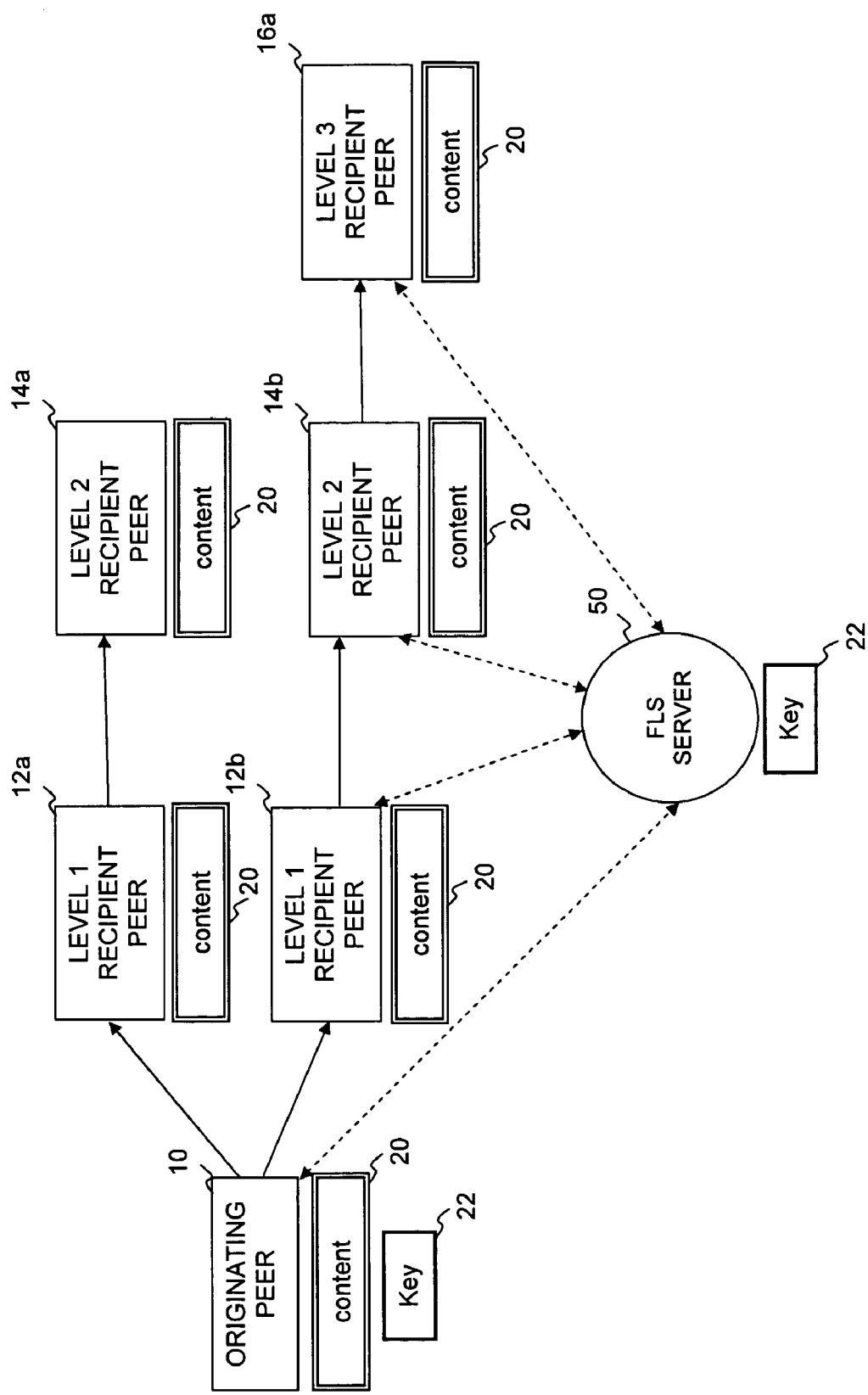
FIG. 1 provides a block diagram representation of an exemplary network interaction among multiple peers and a license server in a social network.

The invention will now be described in detail with reference to particular embodiments thereof. The embodiments are provided by way of explanation of the invention, and are not meant as a limitation of the invention. It will be apparent to those skilled in the art that various modifications and variations can be made in the present invention without departing from the scope and spirit of the invention. For example, features described or illustrated as part of one embodiment may be used with another embodiment to yield a still further embodiment. Thus, it is intended that the present invention include these and other modifications and variations as come within the scope and spirit of the invention, including the appended claims and their equivalents.

Social networks, such as friend-of-a-friend networks, are often utilized to share information among a group of networked contacts. Shared information may correspond to many different forms of electronic content, including but not limited to digital videos, digital images, digital photos, digital audio, text, graphics, html code or other file types, or selective combinations and/or collections of such file types. The present specification is directed to the sharing of digital content with particular exemplary reference to content in video or graphic file format, although it should be appreciated by one of ordinary skill in the art that the disclosed content distribution technology can be applied to other types of electronic content provided in digital or other suitable form. It should also be appreciated that more than one piece of digital content may be selected for distribution, and multiple pieces of content may correspond to different file types.

Aspects of the present invention provide features and steps for ensuring that a given originating peer can share digital content with other contacts in a social network while maintaining control over the access and limited distribution of the shared content. An originating peer can specify distribution parameters including a level limit representative of the maximum number of levels, or degrees of separation, a potential recipient peer may be from the originating peer. Additional content distribution rules/parameters are definable by the originating peer for one or more allowable levels of access, and typically include alteration definitions that may specify degradations, augmentations, or partial deletion of the digital content as it propagates through designated levels in the social network. An originating peer specifies an initial distribution list and the above distribution parameters, and this information is sufficient to control the distribution of specified digital content without prior knowledge of participants and their relationships. As such, limited and controlled distribution of digital content to a dynamic and unstructured social network is afforded. The various social network entities described above (including originating peer and recipient peers) may be considered nodes or peers in direct or indirect networked communication with one another. Additional aspects of controlled content distribution that may be selectively incorporated with the present technology are disclosed in U.S. patent application Ser. No. 11/516,231, entitled "SYSTEM AND METHOD FOR RIGHTS PROPAGATION AND LICENSE MANAGEMENT IN CONJUNCTION WITH DISTRIBUTION OF DIGITAL CONTENT IN A SOCIAL NETWORK", filed on Sep. 6, 2006, currently pending, which is hereby incorporated by reference in its entirety for all purposes.

Additional aspects of the presently disclosed technology make reference to servers, processing units, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file from a second computer, the access may involve one or more intermediary computers, proxies, and the like. The actual file may move between the computers, or one computer may provide a pointer or metafile that the second computer uses to access the actual data from a computer other than the first computer, for instance.

Aspects of the subject content distribution technology are discussed herein in the context of a hybrid peer-to-peer network model. More specifically, a proxy server is employed in order to support license-rights propagation and "lazy content generation", in which different rights-managed forms of digital content are created when requested or required for distribution to different levels in a social network. Certain efficiencies are achieved by waiting until the specific rights-managed forms of digital content are actually utilized or requested, as opposed to completely generating all possible forms/variations of the digital content. Additional efficiencies afforded by the proxy server arrangement disclosed herein include providing network access by proxying for inbound service requests to an originating or sharing peer, increasing network performance by caching content served by the peer, and adding a layer of security by filtering out bad requests for access to content. Still further, by providing features whereby the proxy server acts as a proxy for a peer in a FOAF or social network, transparent digital rights management (DRM) services are provided.

FIG. 1 illustrates aspects of controlled distribution of digital content in a social network as disclosed in the above-referenced co-pending application. The example of FIG. 1 depicts peer interaction in a social network with a FOAF license server (FLS) 50. An originating peer 10 identifies digital content 20 that is to be shared with other peers in a network. It should be appreciated that users of the disclosed technology, including originating peer 10 as well as recipient peers may correspond to individuals, groups of individuals, business entities, etc. and should not be a limiting feature of the present subject matter. In one example, originating and recipient peers may be embodied by such physical systems as a personal computer (PC), mobile terminal device (e.g., cellular telephone), Personal Digital Assistant, or the like.

Before an originating peer actually distributes digital content, certain distribution parameters that establish limitations on how the digital content is to be distributed to one or more recipient peers must be selected. Distribution parameters can include such information as a level limit representative of the maximum number of "degrees of separation" allowed between the originating peer and any recipient peer. In the example of FIG. 1, originating peer 10 designates a level limit of three levels, which means that the selected digital content can only be distributed up to a maximum of three levels away from the originating peer 10.

Distribution parameters can also include an initial distribution list that designates the starting nodes for the dynamically created social network. In the example of FIG. 1, originating peer 10 selects two users in an initial distribution list, corresponding to level one (1) peers 12a and 12b. Level one recipients 12a and 12b are then free to distribute to any entity they wish that is not specifically blocked by the originating peer. For example, in accordance with a second level of content distribution as illustrated in FIG. 1, level one peer 12a may choose to send the selected digital content to level two (2) peer 14a, while level one peer 12b may choose to send the digital content to peer 14b. In accordance with a third level of content distribution, peer 14b decides to forward the digital content to level three (3) peer 16a, while peer 14a does not share the content with further peers. Level three recipient 16a is restricted from further distributing the selected digital content since originating peer 10 defined a distribution level limit of three.

As observed from the layered communication among networked users depicted in FIG. 1, the entire spectrum of distribution is not defined by the originating peer. Instead, the subject content distribution network involves dynamic (or viral) distribution as opposed to a predetermined configuration. Originating peer 10 doesn't know if the selected digital content will reach three or three-hundred people, but it will not be distributed beyond three levels deep in the dynamically created social network. It should be appreciated that the content distribution depicted in FIG. 1 is for exemplary purposes only and many variations are possible in accordance with the disclosed technology. More particularly, each peer in a given level n may decide to share with a lesser or greater number of peers in the next level n+1 than is actually illustrated in FIG. 1.

Additional distribution parameters that are specified by originating peer 10 include alteration definitions for one or more of the three allowable levels in the social network. Alteration definitions may define degradation characteristics for the digital content, such as a number of frames per second, file resolution, file size, length, color or bit rate, or other file characterization parameters as will be known or appreciated by one of ordinary skill in the art. Alteration definitions may also define one or more augmentation files, such as but not limited to visible or invisible watermark(s) or other hindrance(s), advertisement(s), portion(s) of text, and/or supplemental audio or video segment(s) or select combinations or collections of such items for appending, prepending or otherwise incorporating into the digital content. Another parameter may correspond to a maximum number of total recipient peers for overall distribution or for maximum distribution per level. A still further distribution parameter may include one or more relationship types for identifying desirable characteristics or limitations associated with recipient peers authorized to receive versions of the digital content. In one example, originating peer 10 may select a digital video for controlled distribution to recipient peers and may wish to degrade the quality level of the video as it spreads farther away from the originating peer. In one example, level-one peers 12a and 12b receive a highest quality video from originating peer 10. Level-two recipient peers 14a and 14b receive a medium quality version of video, and level-three peer 16a receives a version that is low quality and has advertisements preceding the video playback.

Before originating peer 10 is able to share digital content 20 to other peers in the network of FIG. 1, a desktop application provided on the originating peer's computing system generates certain information, including a key ID, which corresponds to a unique identifier for the selected digital content 20 and also a license key seed (LKS). The LKS is a value that is only known by the originating peer 10 and license server 50, and is used to encrypt the digital content 20. A distribution package including all such information ultimately contains a form of the digital content that has been encrypted and locked with a digital "key" 22. The result is an encrypted file that can only be unlocked by a person who has obtained a license with the required key for decrypting the digital content. Such a license may be received from FLS 50.

With further reference to FIG. 1, FLS 50 is responsible for issuing licenses for each level of peer recipients in the social network, while the peers in the peer-to-peer network are responsible for content propagation. In accordance with the DRM model of FIG. 1, originating peer 10 only shares a content DRM key 22 with FLS 50, so that FLS 50 can issue licenses. For security reasons, key 22 is not shared with recipient peers 12a, 12b, 14a, 14b, 16a, etc. FLS 50 includes in part a license assignment module that creates licenses for received content in response to an access request from a recipient peer. Licenses are created according to the level-rights and distribution parameters defined for the particular peer levels associated with the given digital content. A license generated by FLS 50 includes a key that can be used to unlock, or decrypt the content that was previously encrypted by a user's content distribution desktop application. In the arrangement of FIG. 1, recipient peers 12a, 12b, 14a, 14b, 16a, etc. cannot modify the digital content 20 before forwarding the content downstream to the next level of user(s), if allowed. In the setup of FIG. 1, the entire digital content 20 must be copied and sent at each level, even though users at different levels may only be allowed to view certain portions or degraded or altered versions of the digital content in accordance with access rights defined by the originating peer. Each distribution of the digital content should preserve the original content format in a lossless fashion such that each subsequent level in the distribution network has the necessary quality level associated with its given alteration definition. Although this arrangement provides effective controls on the distribution of digital content in a social network, the proxy server arrangement and hybrid P2P model which will now be discussed provides additional efficiencies.

Figure 2:
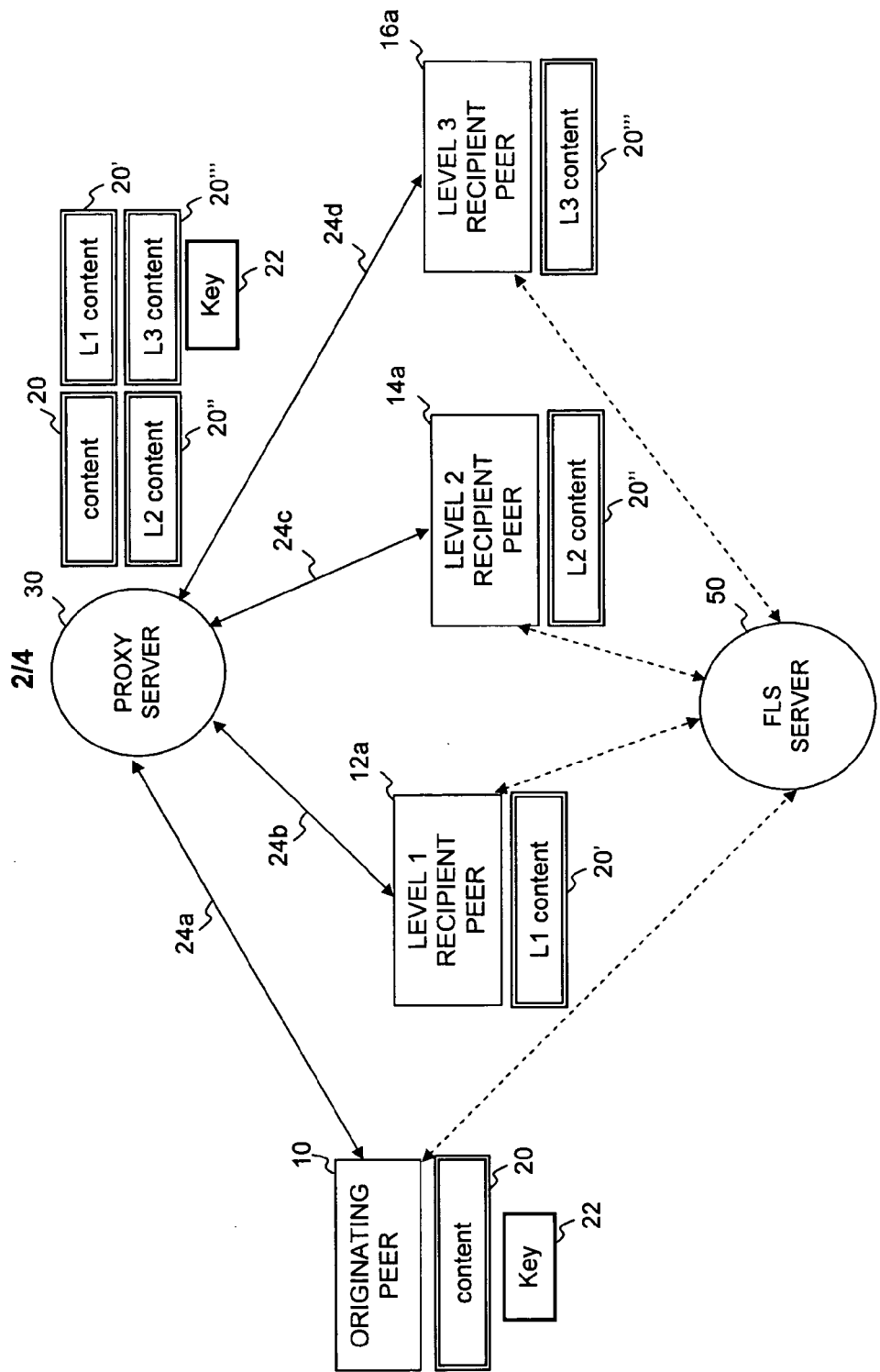
FIG. 2 provides a block diagram representation of an exemplary network interaction among multiple peers, a license server and a proxy server in a social network.

FIG. 2 depicts a network arrangement similar to that of FIG. 1, but with all or a portion of intra-peer communications flowing through a proxy server 30. Proxy server 30 brings a capability to manage DRM and content propagation transparently on behalf of originating peer 10. Proxy 30 also offloads DRM management by taking over DRM functions on behalf of the originating peer automatically as content is introduced into the network. In accordance with the technology disclosed herein, a complete and lossless form of digital content 20 is no longer required to be passed to each recipient peer in the social network. In contrast, only the form of digital content which each recipient peer is authorized to view is ultimately passed to each requesting recipient peer. In addition, any augmented files which are designated by the originating peer for appending, prepending or otherwise integrating with a form of the digital content do not need to be stored at each level in the network. Instead, the video advertisement, graphic or text, or other augmentation file can be extracted from the Internet or fetched from originating peer 10 by the proxy server 30 (or other designated generation peer) during a step of generating a rights-managed form of the digital content. By utilizing references and loading the content only when needed, the file size of shared content can be reduced.

Figure 3:
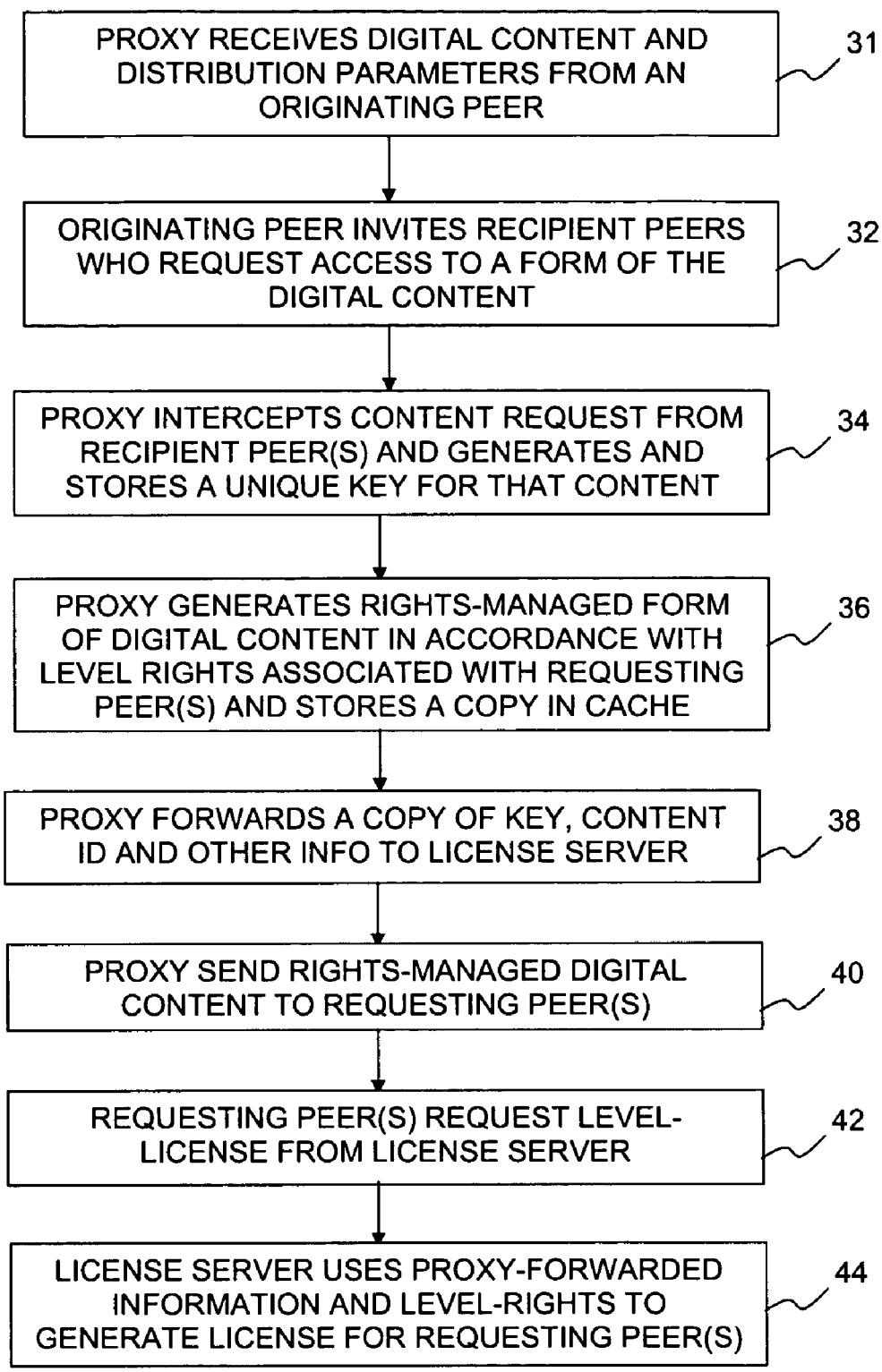
FIG. 3 provides a flow diagram representation of exemplary steps for managing the distribution of digital content as may occur in a network including a proxy server.

An example of the steps that may occur in the network, especially in regards to interaction with proxy server 30 will now be discussed with reference to FIGS. 2 and 3. Although the steps of FIG. 3 are discussed as applicable to the specific network of FIG. 2, it should be appreciated by one of skill in the art that such features and steps are applicable to any dynamically created social network. When an originating peer 10 wants to share digital content 20 in a controlled fashion among nodes in a network, the originating peer 10 introduces the digital content to be shared and also defines distribution parameters, including access rights (or "level-rights") for the content. In step 31, the proxy server 30 receives the digital content 20 and distribution parameters from the originating peer 10. In one exemplary embodiment, originating peer 10 primes proxy server 30 by pushing the level-rights and digital content to proxy 30. In another exemplary embodiment, proxy 30 fetches those items when the content is first requested by a recipient peer (e.g., peers 12a, 14a, 16a). Because digital rights for content 20 are not yet managed at this point in the sequence, the transfer of digital content and distribution parameters from originating peer 10 to proxy server 30 occurs via a secure network transaction. Mechanisms for providing such a secure transaction are well known to those of ordinary skill in the art, and so specific details are not provided herein.

In step 32 of FIG. 3, originating peer 10 sends invitations to a set of level one peers. Only a single level one peer 12a is illustrated in FIG. 2. This example is provided for ease of illustration, and it should be appreciated by one of ordinary skill in the art that a greater number of level one peers as well as peers at other levels in the network may be employed in other arrangements of the present technology. After a level one peer (such as peer 12a of FIG. 2) receives an invitation to view digital content (or some modified form thereof), the recipient peer requests such content from the originating peer. This request for the digital content is then intercepted by proxy server 30 in step 34. Peers 10, 12a, 14a, 16a, etc. and proxy 30 communicate via socket connections that are established among such respective nodes. These socket connections are represented by the solid bidirectional links 24a, 24b, 24c and 24d, respectively of FIG. 2. Each peer node may establish a socket connection or other communications link with proxy server 30 when it comes online or when it enables its controlled distribution desktop application for sharing the digital content. Proxy server 30 may store information identifying each socket connection and associated nodes in socket connection and/or Internet Protocol (IP) address tables. When a recipient node requests the digital content (by way of an Hypertext Transfer Protocol (HTTP) request or request in other appropriate form), the proxy server 30 may be adapted to recognize the requesting node and thus properly intercept the data request. Additional details regarding basic operational parameters of a proxy server such as may be embodied by proxy server 30 of FIG. 2 are disclosed in the following pending U.S. Patent Applications, each of which is incorporated by reference herein in its entirety for all purposes: U.S. patent application Ser. Nos. 10/927,291 entitled "PROXY CACHING IN A PHOTOSHARING PEER-TO-PEER NETWORK TO IMPROVE GUEST VIEWING PERFORMANCE"; 10/813,839 entitled "METHOD AND SYSTEM FOR PROVIDING WEB BROWSING THROUGH A FIREWALL IN A PEER TO PEER NETWORK"; 11/234,493 entitled "SYSTEM AND METHOD FOR LOWERING PROXY BANDWIDTH UTILIZATION"; and 10/941,673 entitled "PEER PROXY BINDING".

With further reference to FIGS. 2 and 3, after the proxy 30 intercepts in step 34 a content request from a recipient peer (such as from level one peer 12a), proxy 30 generates a unique key 22 for the digital content 20, and stores that key 22 in a local database for future use. Using the level-one access rights defined by the originating peer 20 and the key 22 generated in step 34, the proxy 30 then generates in step 36 a rights-managed form of the digital content. When requested by a level-one peer recipient, the rights-managed form of the digital content will be referred to as L1 content 20'. In similar fashion, the rights managed forms of digital content respectively requested by level two or level three peers will be referred to herein as L2 content 20" and L3 content 20"', respectively. In one exemplary embodiment, each step of generating a rights-managed form of the digital content may occur only after a recipient peer requests access to such form of content. In another exemplary embodiment, proxy 30 may be alerted when an invitation for a particular level has occurred and may then pre-generate the rights-managed form of content for that given level. This latter generation option may be a particularly useful optimization when generation of the rights-managed form of content may take a significant amount of time. After the rights-managed form of digital content is created, proxy server 30 may store a copy of the generated content in its proxy cache, or other associated memory location.

In step 38, proxy 30 forwards a copy of the key 22 to FLS 50, along with the unique content ID and any other information needed by FLS 50 to generate licenses for the requesting peers in the network. Step 38 may preferably occur via secure communications channel due to the sensitive nature of the key and identification information. The communication channel between proxy 30 and FLS 50 is represented in FIG. 2 by the dotted bi-directional link 25. In a subsequent step 40, proxy 30 returns the rights-managed form of the digital content (e.g., L1 content 20') to the requesting peer (e.g., level-one peer 12a). The requesting peer (e.g. level-one peer 12a) then requests in step 42 a level license from FLS 50. In step 44, FLS 50 uses the proxy-forwarded information (i.e., the key, unique content ID, etc.) as well as the level-rights defined by originating peer 10 to generate a license for the requesting peer. At this point, the requesting peer (e.g., peer 12*a*) has already received a locked copy of L1 content 20'. Once the requesting peer (12*a*) receives a license from FLS 50, it can use a "key" embodied within the requested and received license to "unlock" and view the L1 content.

After the level-one peer 12*a* accesses L1 content 20', it may send an invitation to one or more level-two peers (e.g., peer 14*a*) to view a form of the digital content. This process of dynamically sharing the digital content may continue until the content reaches the limit of n levels originally defined by originating peer 10. In subsequent requests for the digital content, proxy 30 can use the previously generated key 22, but may need to generate additional rights-managed forms of digital content (e.g., L2 content 20" and L3 content 20''') as they are requested or required at subsequent allowed levels in the network.

In the exemplary discussion above, the various rights-managed forms of the digital content are generated by proxy server 30. It should be appreciated that the generation of such content forms may be delegated to peers in the network. For instance, it is possible that if the proxy 30 knows that the originating peer is online and/or if the proxy does not have enough system resources, it may forward the request for the level n content to the originating peer and allow the originating peer 10 to generate one or more of the rights-managed forms of content. Alternatively, the proxy 30 may select another peer (other than the originating peer 10) that is part of the social network for performing the tasks of generating and forwarding a rights-managed form of the digital content. The proxy 30 would then fetch the generated rights-managed form(s) of content and store it in the proxy cache for subsequent requests by other network nodes. In other embodiments, the proxy 30 may offload the content form generation when some predetermined condition is determined to exist. For example, when the digital content for sharing is bandwidth rich content, it may be desirable to lower the bandwidth utilization of the proxy server by delegating the steps of generation and sending of content forms to the originating peer or another designated peer or peers in the network.

In instances when the proxy 30 selects another peer in the network for generating rights-managed form(s) of the digital content, proxy 30 stores identification information about such task delegation in a local database. For example, proxy 30 may include one or more internal tables for storing at least one content identification parameter indicating the original portion(s) of digital content and/or select forms of the digital content that are to be generated therefrom. Such an internal table may also include at least one peer identification parameter that identifies the peer(s) in the network to which the generation tasks were delegated. The peer identification parameters may include an Internet Protocol (IP) address, a Uniform Resource Identifier (URI) including Uniform Resource Locators (URLs) or others, and/or any other suitable type of parameter for identifying the location of the delegated peer(s) in the network. Provision of the peer and or content identification parameters enables the proxy 30 to later fetch the generated information from the delegated peer(s). The internal table(s) in which such content identification parameter(s) and peer identification parameter(s) are located are referred to herein as a task delegation identification database 65 as represented in FIG. 4.

A still further aspect of the presently disclosed technology involves handling of rights modification which may be desired by an originating peer. If an originating peer decides to modify or revoke any of the level-rights initially established for sharing a given portion of digital content, those parameters should be updated at the proxy server 30. In one embodiment, an update is automatically provided from the originating peer 10 to the proxy any time such updates occur. In another embodiment, updates are determined by configuring the proxy server to periodically check with the originating peer to determine if rights to the given digital content have been changed or revoked. The proxy can then update its stored information regarding such level-rights.

Figure 4:
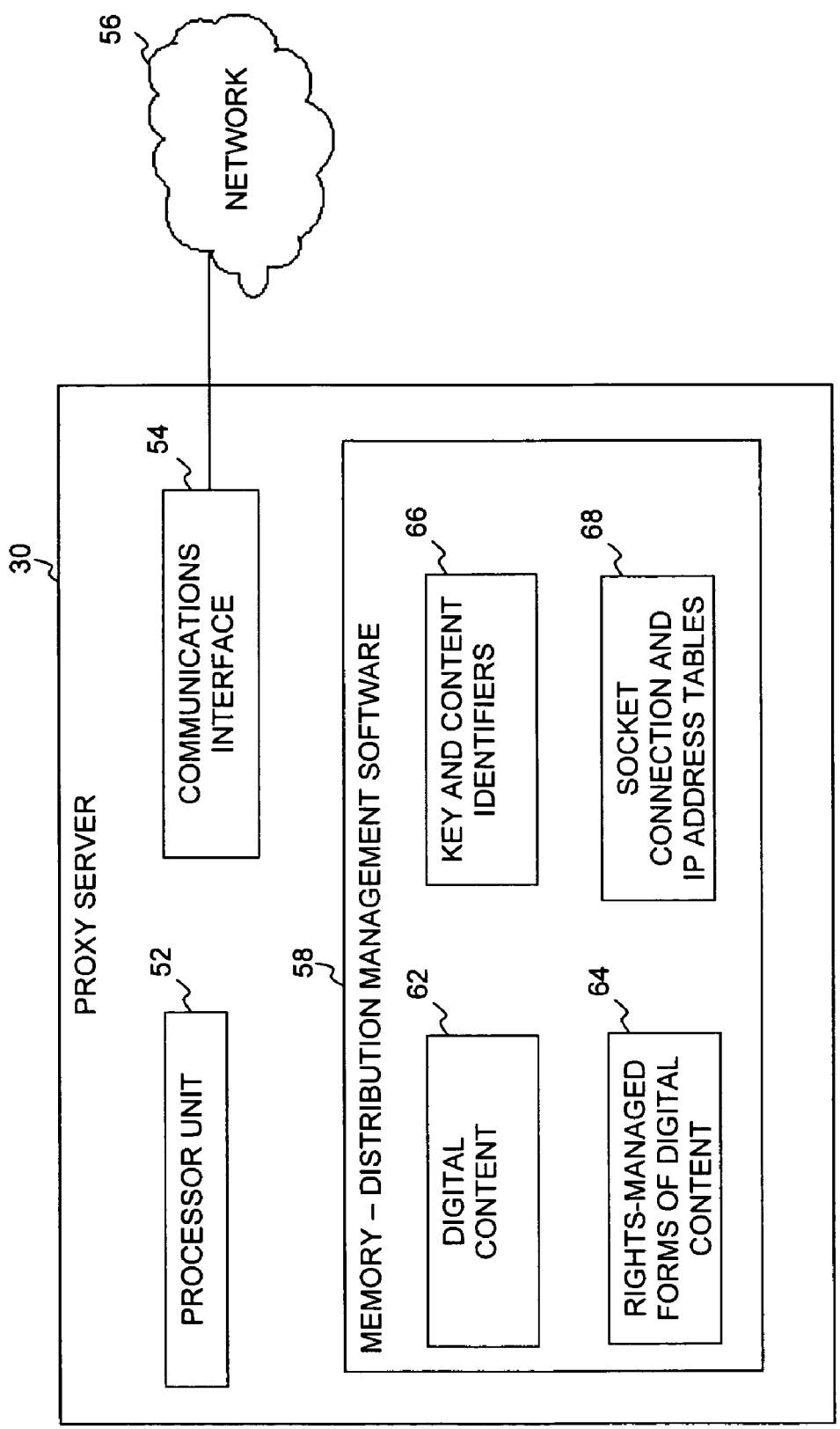
FIG. 4 provides a block diagram representation of exemplary hardware and software components for a proxy server in accordance with one embodiment of the present invention.

Referring now to FIG. 4, physical hardware and software features included in an exemplary embodiment of proxy server 30 will now be discussed. Proxy server 30 includes a processor unit 52, which may be any type of processor as included or associated with a personal computer (PC), server system, mobile terminal device (e.g., cellular telephone), Personal Digital Assistant, or the like. The processor unit 52 of exemplary proxy server 30 may be configured to process data transmitted to or received from other users. A communications interface 54 may also be provided to buffer or otherwise handle the actual relay of such communicated data as it is sent or received over a network 56. Network 56 may correspond to a dial-in network, a local area network (LAN), wide area network (WAN), public switched telephone network (PSTN), the Internet, intranet or ethernet type networks and others over any combination of hard-wired or wireless communication links. Optional input peripherals (not illustrated) may be coupled to proxy server 30 so that a proxy manager can provide input for selecting performance characteristics for the proxy server. Examples of possible input peripheral devices include a keyboard, touch-screen monitor, mouse, scanner, microphone, etc. Although not illustrated in FIG. 4, additional peripheral devices including but not limited to user displays, printers, etc. may also be provided in conjunction with proxy server 30.

Referring still to the proxy server 30 of FIG. 4, memory 58 is also provided for storing a variety of digital information, including data and software or firmware. Memory 58 may be provided as a variety of computer-readable medium, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.). As will be further discussed in the present specification, memory 58 may be a designated storage location for specific information, such as but not limited to digital content 62, generated rights-managed forms of the digital content 64, task delegation identification database 65, content identifiers, keys and the like 66, socket connection and IP address tables 68, and other information. Memory 58 may also be configured to store program instructions and executable code corresponding to the controlled content distribution and management functions that are performed by proxy server 30. Program instructions and executable code that are stored in memory 58 are typically read and executed by the processor unit 52 in the proxy server.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention.

What is claimed is:

1. A method of distributing rights-managed forms of digital content among nodes comprising computing devices, comprising the following steps:
receiving digital content comprising an original form for distribution to one or more downstream nodes and receiving distribution parameters associated with the digital content from an originating node, wherein the distribution parameters define access rights for a plurality of levels based on a number of nodes in a path of an invitation to view the digital content that is propagated from the originating node to the one or more downstream nodes, and wherein at least some of the one or more downstream nodes further propagate the invitation to other downstream nodes;
receiving a request for the digital content from a respective downstream node of the one or more downstream nodes that received the invitation to view the digital content;
in response to receiving the request, determining a one of the plurality of levels that corresponds to the respective downstream node based on a number of downstream nodes in the path of the invitation from the originating node to the respective downstream node;
obtaining a rights-managed form of the digital content that is derived from the original form and that is different from the original form in accordance with access rights established by the originating node for the one of the plurality of levels that corresponds to the respective downstream node; and
sending a copy of the rights-managed form of the digital content to the respective downstream node.

2. The method of claim 1, wherein said obtaining step occurs after receiving a request for access to the digital content from the respective downstream node.

3. The method of claim 1, wherein said obtaining step occurs after the invitation to view the digital content is sent from the one or more downstream nodes to another of the one or more downstream nodes.

4. The method of claim 1, wherein the distribution parameters defined by the originating node comprise at least one alteration definition for one or more of the plurality of levels.

5. The method of claim 4, wherein each alteration definition identifies one or more of a degradation characteristic for applying to the digital content and an augmentation file for adding to the digital content.

6. The method of claim 1, further comprising a step of caching a copy of the rights-managed form of the digital content.

7. The method of claim 1, further comprising a step of generating a unique key for the digital content.

8. The method of claim 7, further comprising a step of storing the unique key in a local database.

9. The method of claim 7, further comprising a step of sending a copy of the unique key and a content identifier to a license server.

10. The method of claim 1, wherein said step of receiving digital content and distribution parameters is performed via a secure connection.

11. The method of claim 1, further comprising a step of receiving and storing updates to the distribution parameters associated with the digital content.

12. The method of claim 1, wherein obtaining the rights-managed form of the digital content further comprises generating a plurality of respective rights-managed forms of the digital content, wherein each of the plurality of respective rights-managed forms of the digital content corresponds to a different one of the plurality of levels defined by the originating node, and wherein sending the copy of the rights-managed form of the digital content further comprises sending the copy of the rights-managed form of the digital content that corresponds to the one of the plurality of levels to the respective downstream node.

13. The method of claim 12, further comprising a step of caching each of the respective rights-managed forms generated for each of the plurality of levels.

14. The method of claim 1, further comprising a step of designating another downstream node to perform the obtaining and sending steps.

15. The method of claim 14, further comprising a step of fetching and caching the copy of the rights-managed form of the digital content generated by the another downstream node.

16. A method of selecting a particular resolution of digital content from a plurality of resolutions of the digital content, comprising:
receiving a request for digital content from a respective recipient computing device which received an invitation to view the digital content;
determining a recipient level of a plurality of recipient levels that corresponds to the respective recipient computing device based on a number of recipient nodes in a path of the invitation to view the digital content that propagated through a plurality of recipient computing devices from an originating computing device to the respective recipient computing device;
selecting a first resolution of the digital content from a plurality of different resolutions of the digital content based on the recipient level, wherein each of the plurality of different resolutions of the digital content corresponds to a different recipient level; and
effecting delivery of the first resolution of the digital content to the respective recipient computing device.

17. A server computing device comprising:
a communication interface adapted to interface with a network; and
a processor unit coupled to the communication interface and programmed to:
receive a request for digital content from a respective recipient computing device which received an invitation to view the digital content;
determine a recipient level of a plurality of recipient levels that corresponds to the respective recipient computing device based on a number of recipient nodes in a path of the invitation to view the digital content that propagated through a plurality of recipient computing devices from an originating computing device to the respective recipient computing device;
select a first resolution of the digital content from a plurality of different resolutions of the digital content based on the recipient level, wherein each of the plurality of different resolutions of the digital content corresponds to a different recipient level; and
effect delivery of the first resolution of the digital content to the respective recipient computing device.

18. The method of claim 1, wherein determining the one of the plurality of levels that corresponds to the respective downstream node based on the number of downstream nodes in the path of the invitation from the originating node to the respective downstream node further comprises determining that the invitation propagated from the originating node to a first downstream node, from the first downstream node to a second downstream node, and from the second downstream node to the respective downstream node, and determining that the respective downstream node is a third downstream node in the path of the invitation from the originating node to the respective downstream node.

* * * * *